INVENTORS
THOMAS B. ARNOLD
ROBERT E. CARSON
BY
Lothrop & West
ATTORNEYS

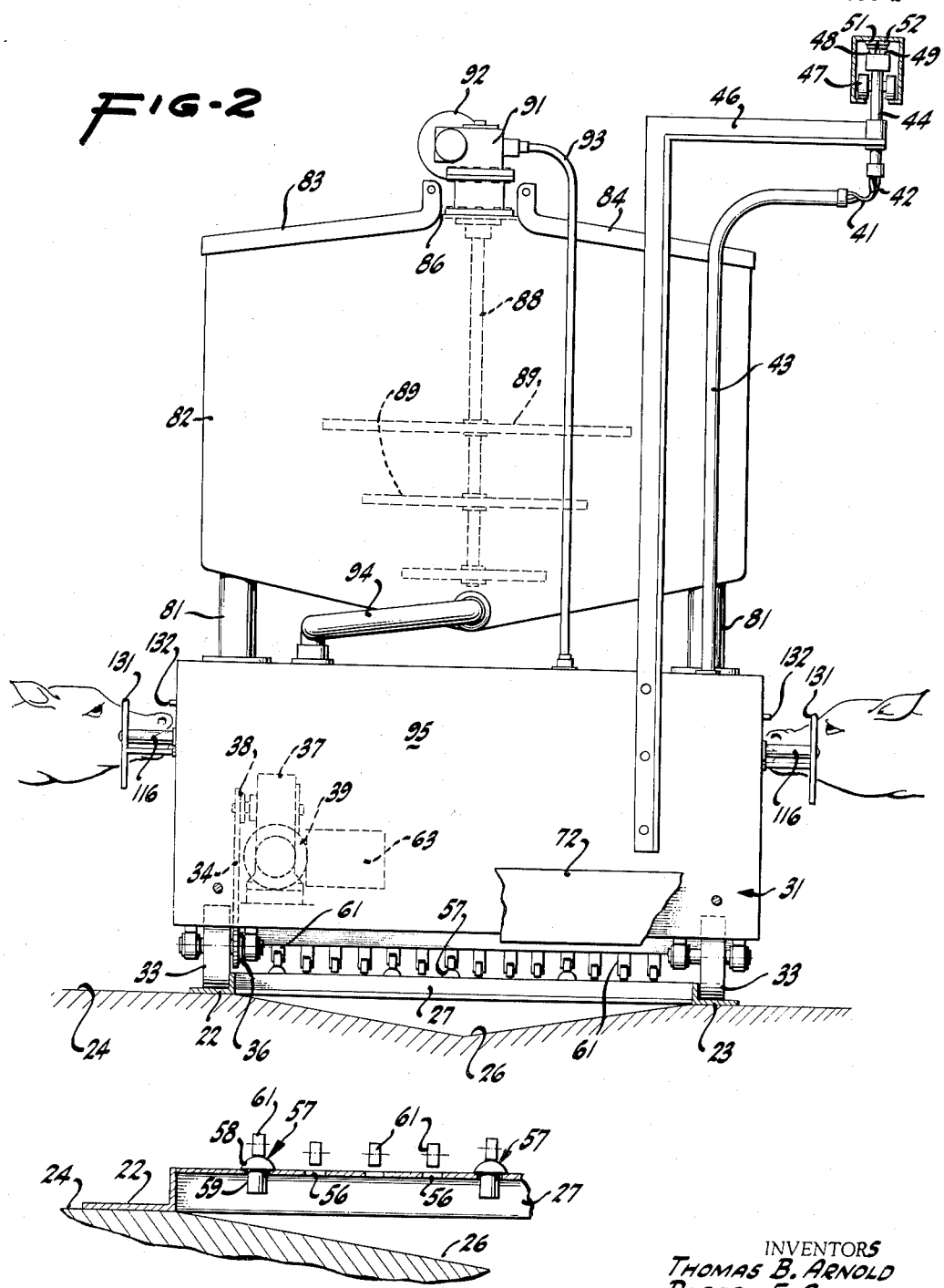

Sept. 7, 1965          T. B. ARNOLD ETAL          3,204,607
AUTOMATIC MOBILE SUCKLING DEVICE
Filed Dec. 9, 1963                                                      4 Sheets-Sheet 3
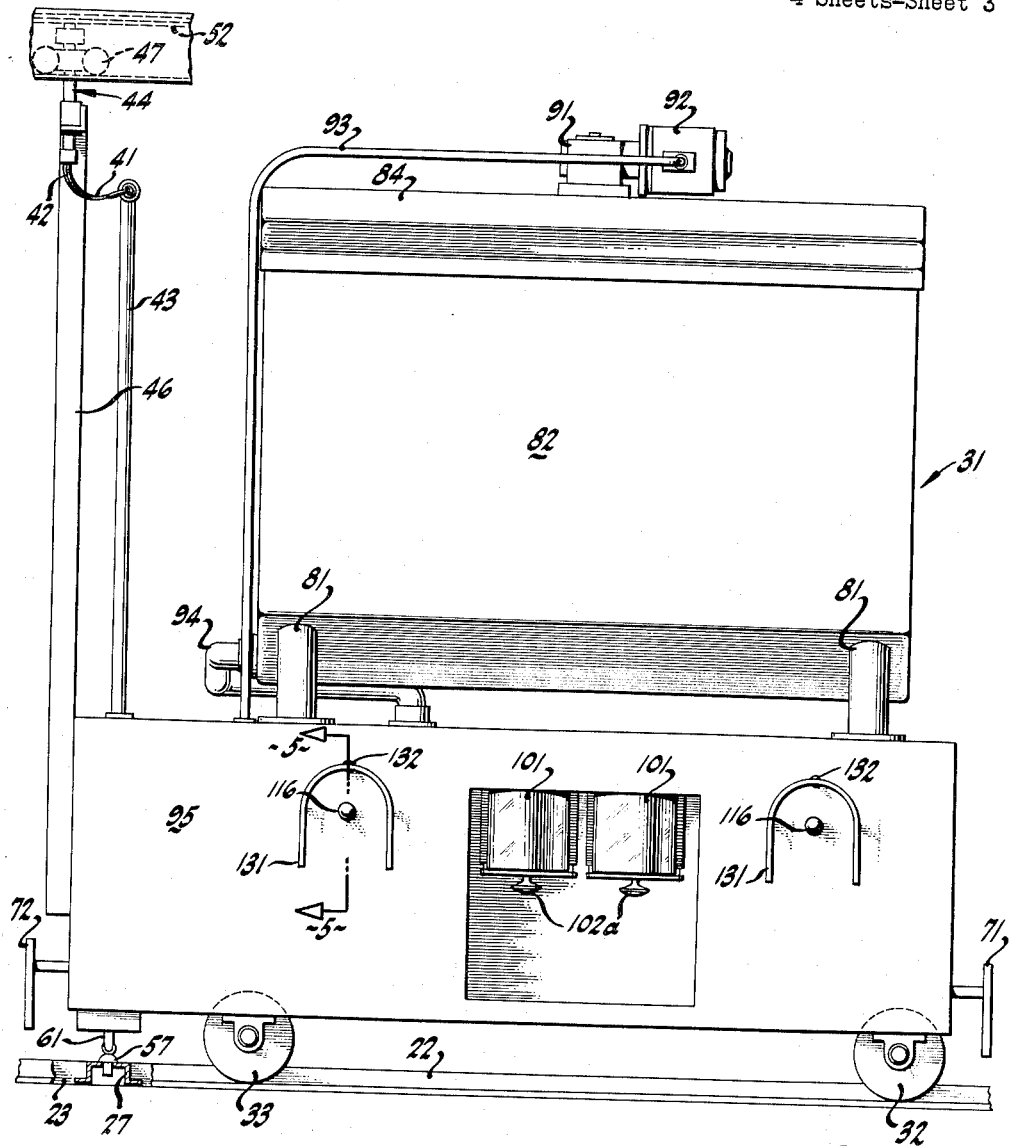
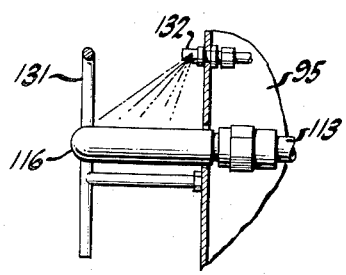
INVENTORS
THOMAS B. ARNOLD
ROBERT E. CARSON
BY
Lothrop & West
ATTORNEYS

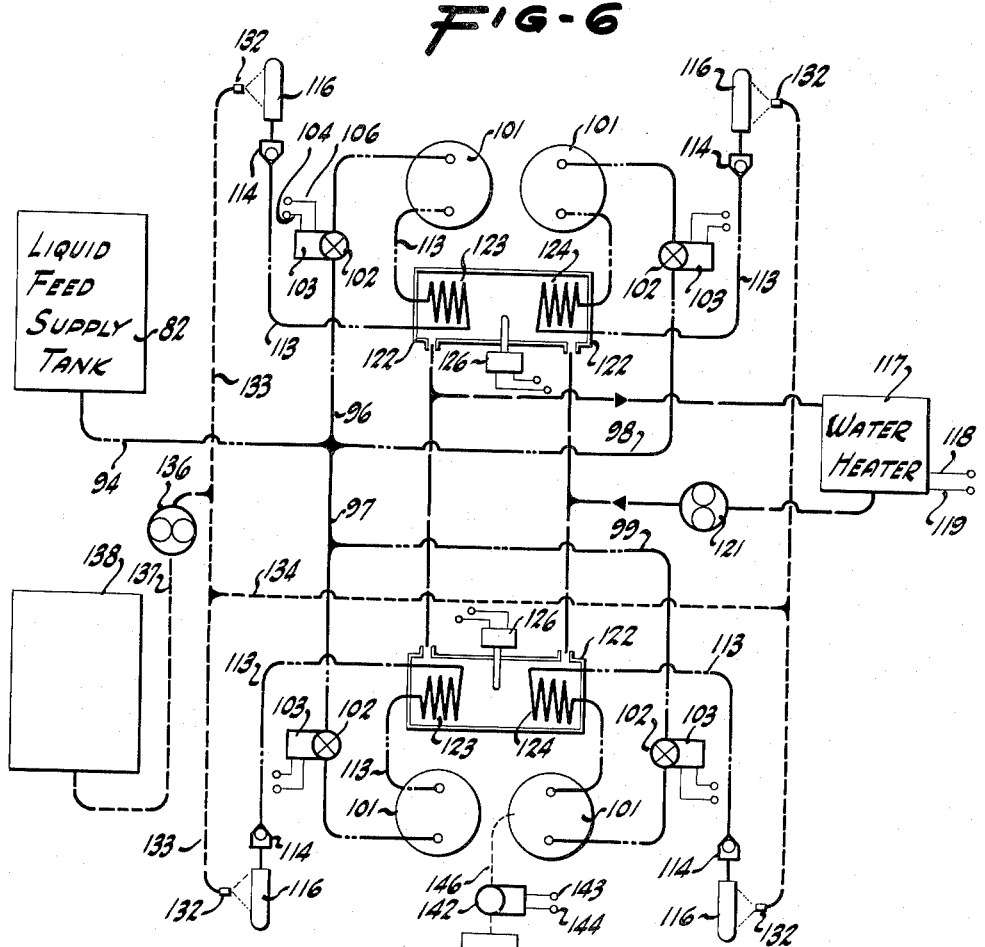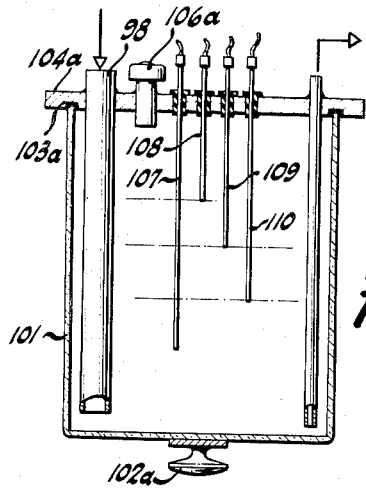

United States Patent Office 3,204,607
Patented Sept. 7, 1965

3,204,607
AUTOMATIC MOBILE SUCKLING DEVICE
Thomas B. Arnold, Hilmar, Calif., and Robert E. Carson, 7541 E. Parkway, Sacramento, Calif.; said Arnold assignor to said Carson
Filed Dec. 9, 1963, Ser. No. 328,918
6 Claims. (Cl. 119—51.11)

Our invention particularly relates to means for automatically feeding a relatively large number of head of livestock such as calves. A commercial embodiment of the invention has been especially constructed for use in feeding young calves and reference thereto is made hereinafter, although the same mechanism can be utilized equally well in livestock feeders for use by other kinds of stock.

It is an object of the invention to provide means for periodically feeding a large number of calves with the utilization of but a small amount of manual labor.

Another object of the invention is to provide means for feeding livestock periodically and without the necessity of human supervision.

Another object of the invention is to provide a livestock feeder effective to dispense the desired amount of liquid feed to the individual ones of a large number of livestock.

Another object of the invention is to provide a livestock feeder which is consistent and safe in its operation under all normal operating conditions.

A still further object of the invention is to provide a livestock feeder in which the liquid feed is supplied to the livestock under appropriate and optimum conditions.

Another object of the invention is to provide a livestock feeder which can readily be attended and serviced when necessary and is capable of long, trouble free operation.

A still further object of the invention is to provide a livestock feeder which maintains a high degree of sanitation and can easily be cleaned and disinfected.

A further object of the invention is in general to improve livestock feeders.

Other objects together with the foregoing are attained in the embodiment of the invention described in the accompanying description and illustrated in the accompanying drawings in which FIGURE 1 is a plan of a livestock feeding lot laid out to take advantage of the livestock feeder of our invention.

FIGURE 2 is for the most part an end elevation of the carriage forming part of the livestock feeder, the lower portion of the figure, including some of the floor and the track, being in cross section on a transverse, vertical plane.

FIGURE 3 is a side elevation of the structure shown in FIGURE 2.

FIGURE 4 is an enlarged detail in vertical cross section on a transverse plane of some of the controlling mechanism utilized in the livestock feeder.

FIGURE 5 is a detail showing partially in cross section but primarily in elevation a nipple and disinfecting arrangement forming part of the livestock feeder.

FIGURE 6 is a diagram illustrating some of the fluid and electrical interconnections forming part of the livestock feeder.

FIGURE 7 is a cross section on a transverse vertical plane through one of the liquid feed chambers showing the level sensing mechanism therein.

Figure 1:
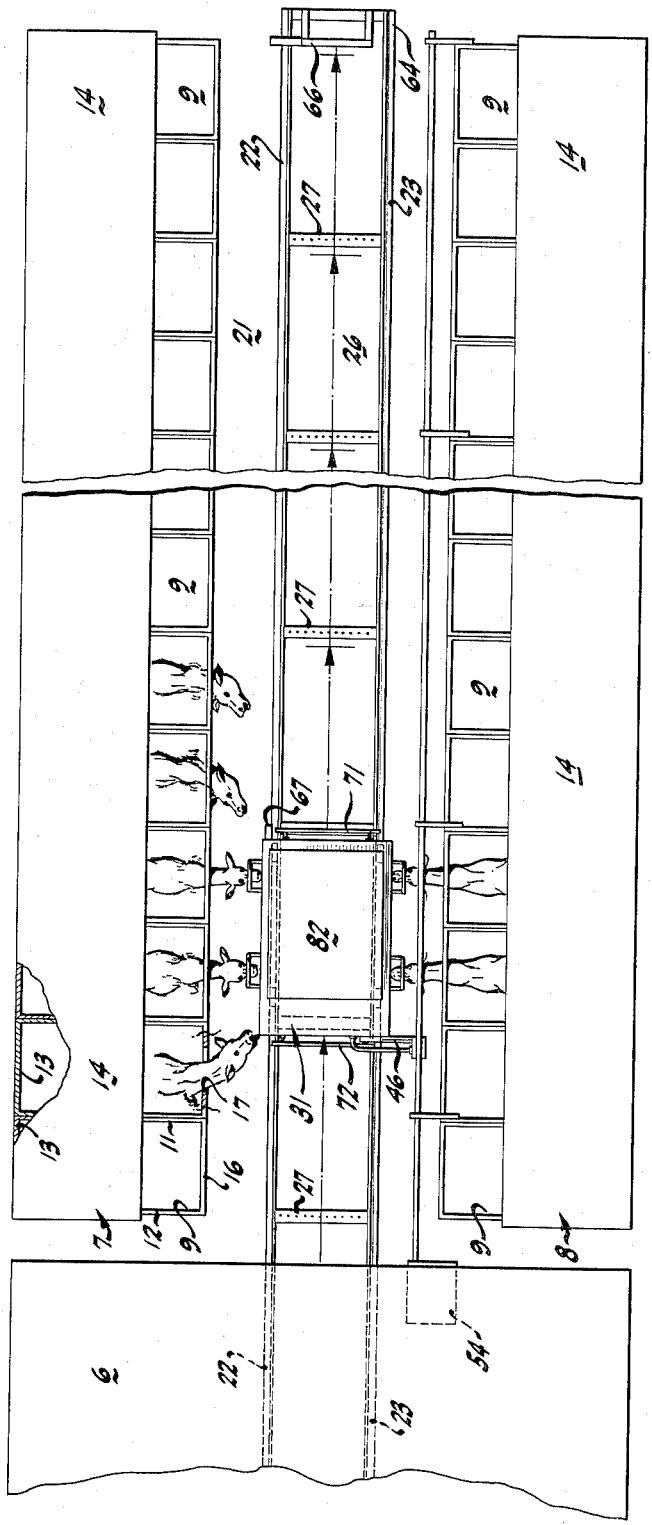

While the livestock feeder pursuant to the invention can be incorporated in a number of different ways especially contingent upon the property on which it is to be situated and the number of head of calves to be fed, a convenient arrangement for a rectangular plot of land is as shown in FIGURE 1. In this arrangement there is provided a shed or house 6. This is a suitable enclosure standing at one end of a pair of parallel rows 7 and 8 of facing calf pens 9. The pens are all substantially identical and are uniform in spacing and size, each being adequate to afford room for one relatively young calf. Each of the pens 9 has a pair of side walls 11 and 12, a rear wall 13 and a partial roof 14. In addition, there is afforded a front wall 16 adequate to retain the calf within the pen but inclusive of a head and neck opening 17 through which the calf's head may be extended. The rows 7 and 8 of pens are substantially of equal length and are symmetrical about the center line of the layout so that calves on either side of the center face each other across an intervening alleyway 21.

Extending from a location within the shed 6 and disposed substantially for the full length of the alleyway on either side of the center line thereof is a pair of tracks 22 and 23. The shed 6 is largely enclosed but has an opening affording free access between the alleyway 21 and the shed interior. The individual tracks 22 and 23 are conveniently formed of angle irons with their lower or horizontal flanges imbedded in or fastened to a paved floor 24 preferably of concrete or the like. The floor is contoured to provide a central, longitudinally extending trough 26 with appropriate drains, not shown. The tracks 22 and 23 at appropriate intervals are joined by tie bars 27 or cross straps preferably made of metal and permanently secured to the rails 22 and 23. Each of the individual tie bars 27 constitutes a marker for an individual station. Each station is related to a pair of pens on one side of the track and to an opposite pair of pens on the other side of the track.

Adapted to run on the tracks 22 and 23 and to be guided thereby is a carriage 31. This includes pairs of track engaging wheels 32 and 33. At least one of the wheels such as 33 is provided with means for rotating or driving the wheel and thus advancing the carriage 31 along the track. A chain 34 is connected to a sprocket 36 fast to the wheel 33 and also extends to a speed reducer 37 carrying a complementary sprocket 38 engaging the chain and operated by an electric motor 39. The motor is of the reversible type and is controlled through appropriate circuitry and mechanism. The motor and the control mechanism are connected to a suitable electrical source through conductors 41 and 42 carried in a conduit 43 upstanding from the carriage 31 and extending to a trolley mechanism 44 mounted on an upright 46 on the carriage. The trolley not only includes supporting wheels 47 but has brushes 48 and 49 bearing against separate electrical conductors 51 and 52 extending for the entire length of the alleyway 21 and leading into the shed 6. By this means the carriage 31 at any position within the shed or at any location along the tracks 22 and 23 is supplied with electrical power. As the motor 39 is operated, stopped or reversed, so is the position of the carriage 31 and its operation controlled.

In the normal operation of the feeding arrangement, it is desired that feed in the form of liquid be supplied to the calves at periodic intervals, for example six times each day of twenty-four hours or at four hour intervals. For that reason there is provided in the shed 6 a timing control 54 incorporating a well-known clock mechanism. Through the electrical connections the motor 39 is periodically energized and the carriage is advanced from its rest position within the shed 6 along the track.

In some installations it is preferred to mount the clock mechanism within the carriage rather than in the shed. In either event, the trolley is kept energized by appropriate electrical connections to maintain water temperature and for proper operation of other electrical equipment.

Pursuant to the invention, the carriage is stopped at each of the stations identified by the cross ties 27. It remains at the station for a predetermined period of time and then advances to the next station. The carriage at each station is preferably arrested on a selective basis along with other functions to be controlled. For that reason, particularly as shown in FIGURE 4, each of the cross ties 27 (which conveniently can be an angle or channel) is formed with a plurality of apertures 56 therein spaced at appropriate locations. The apertures are designed easily to receive one or more actuating buttons 57. Conveniently, the actuating buttons are ordinary, metal rivets having hemispherical heads 58 and straight shanks 59. The rivets can easily be carried about by a user. They can be dropped into the selected ones of the plurality of apertures 56 and will remain therein until removed by the user.

The heads 58 project upwardly above the cross tie in selected positions to be engaged by aligned ones of a plurality of electrical switches 61 arranged in a row across the bottom of the carriage 31. The switches are individually connected to control various functions. One of the buttons 57 at each station 27 and its associated switch 61 stops or interrupts the advance of the carriage when the carriage is aligned with the first pair of pens on the left of the alleyway 21 and the first pair of pens on the right of the alleyway 21. Similar buttons 57 are provided in each of the cross ties at each of the stations throughout the length of the alley. The carriage gets a similar stop impulse at each station. Of course, if for some reason an individual station is to be skipped and the carriage is not to stop there then the user simply withdraws the button 57 from the cross tie at that particular station to eliminate the stopping or inactivating impulse at that location.

When the switch 61 for the stopping or inactivating impulse is engaged by the button 57 during the advance of the carriage then the electrical circuit to the motor 39 is interrupted and the motor is stopped. Preferably the gear reduction 37 is non-overhauling so that the carriage 31 does not coast but is held in location even though the tracks 22 and 23 may have some inclination in either direction. At the same time that the circuit to the motor 39 is interrupted, the impulse from the switch 61 actuated by the stop button also begins the operation of a timer 63. Depending upon its adjustable setting, this timer holds the circuit to the motor 39 open for a predetermined period; for example, three minutes. At the conclusion of the time interval the timing device 63 reactivates the electric circuit to the motor 39. The re-energized driving motor again advances the carriage 31 along the tracks 22 and 23. The carriage continues until a stop button 57 in a succeeding station is effective again to actuate the appropriate one of the switches 61 and the cycle just described is repeated. Under normal conditions, the carriage 31 having initially left the shed 6 under the starting impulse of the main timing control 54 advances in an intermittent fashion between the successive stations, stopping at each station for a set or predetermined length of time.

Since the tracks 22 and 23 are usually laid out in a straight line or at least do not form a closed loop, the track in addition to having one end within the shed 6 has a remote end 64 at the end of the alley 21. At the end 64 the advancing carriage 31 strikes a bumper 66 actuating a reversing switch 67 and reversing the motor 39. In the reverse circuit of the motor the switches 61 are not effective so that the returning or retracting carriage travels directly without stopping from the far end 64 back to the shed 6. By a similar switching arrangement in the shed, the carriage comes to rest subject to the timing control 54 which again dispatches the carriage at the beginning of the next feeding cycle.

As a safety precaution in the event any blockage should be on or near the track, such as a loose calf, the carriage is provided with both front and rear bumpers 71 and 72. These are connected immediately to interrupt the electrical supply to the motor 39 and immediately stop the carriage 31 until an attendant removes the obstruction and re-energizes the circuit.

Means are provided on the carriage for conducting an appropriate supply of liquid feed to the calves. Mounted on the framework 81 of the carriage is a well insulated tank 82 conveniently fabricated of stainless steel for ready sterilization. The tank 82 has top covers 83 and 84 both of which can be opened not only by sterilization but also for replenishing the supply of liquid feed in the tank. The liquid feed varies from time to time and with the nature of the feeding being done but preferably it is carefully compounded of milk solids, water, various antibiotic and growth materials and is a formulation particularly designed for improved livestock feeding.

The nature of the liquid feed is such that it is preferable to keep the solids in suspension. For that reason an agitator 86 extends into the tank 82 from the roof 87. This includes a vertical shaft 88 having impellers 89 adjacent the lower end thereof. The shaft depends from a gear reduction 91 driven by an electric motor 92. A supply line 93 extends to the motor from the control mechanism and derives its electricity from the trolley. Under most conditions the agitator blades 89 are kept revolving continuously at a relatively slow rate.

The liquid feed from the tank 82 flows out or discharges through a drain line 94 for further handling within an enclosure 95 at the bottom of the carriage 31. The arrangement is such that four calves are fed at once during each stop of the carriage at each station. Since the structure for each of the calves is substantially the same as that for the others, a description of one of them applies equally to the others. As particularly shown in FIGURE 6, the liquid feed flowing through the discharge conduit 94 travels through four branches 96, 97, 98 and 99 to each of four feed retaining chambers 101. Interposed in the liquid path between the line 94 and each of the chambers 101 is a flow control valve 102. This is actuated by an electromagnetic device or solenoid 103 provided with leads 104 and 106 in an appropriate electric circuit, not shown. Each of the chambers 101 conveniently is a clear glass receptacle secured by a strap and operating handle 102a on the bottom thereof against a gasket 103a in a plate 104a forming part of the machine frame.

The particular conduit 96 which leads the liquid feed to the chamber 101 passes through the plate 104a and terminates just above the bottom of the chamber 101. An air vent 106a is provided in the plate 104a and contains filter material so that the inside of the chamber 101 is protected from atmospheric dust. Within the chamber are electrodes one of which, 107, is connected to the "ground" side of the same circuit which includes the leads 104 and 106. Also extending into the chamber 101 but terminating at different levels therein are other electrodes 108, 109 and 110, for example. These extend to any desired level in the chamber and can be provided in any number, although three are customary. The circuitry for the electrodes is such that when liquid in the chamber 101 has risen over the ground electrode 107 and has contacted an effective one of the other electrodes 108, 109 or 110 the circuit to the solenoid 103 is affected. The valve 102 is closed and further flow to the chamber 101 is interrupted. By this means and by appropriately energizing any one of the electrodes 108, 109 or 110 the operator can select the level or liquid feed to be received in the container 101.

Since it is often desired to provide individual calves at the individual stations with different amounts of liquid feed, some of the switches 61 are included in the circuitry of the electrodes 108, 109 and 110 of each chamber 101. Thus, if a calf in the first, left-hand pen at the first station is to have a quantity of liquid feed represented by a level at the bottom of the electrode 109 then the attendant prepositions one of the buttons 57 in the particular hole or aperture 56 in the cross rail 27 at the first station corresponding to that electrode. When the carriage arrives at the first station and stops, only the switch energizing the electrode 109 is closed and the electrode 108 and 110 are left out of the circuit. When the liquid feed level rises to the bottom of the electrode 109 the solenoid 103 is actuated, the valve 102 is closed. Only this predetermined and selected amount of liquid feed (up to the bottom of the electrode 109) is provided in the container 101.

Because there are four of the chambers 101 on the carriage, two on each side, there are sufficient apertures 56 in the track in appropriate locations with regard to the switches 61 on the carriage so that an individual quantity selection can be made for each one of the four chambers on the carriage. The individual calves throughout the entire feeding lot can have selected for them in advance any one of several desired quantities of liquid feed. After the liquid feed has been measured into the chamber 101, it is available for the calf. From each chamber 101 a conduit 113 extends through a check valve 114 to a rubber nipple 116 projecting transversely from the carriage 31 at an appropriate height and location so as to be substantially in alignment with the center of the adjacent pen when the carriage is stopped at its station.

The liquid feed can be without any particular control of temperature, but it is desired that the temperature be elevated. Mounted on the carriage 31 is a water tank 117 having an electric heater therein supplied from electric leads 118 and 119. The water heater is thermostatically controlled so that the water has the desired temperature. From the water heating tank, water is withdrawn by an electrically driven water pump 121 on the carriage 31 and is discharged laterally into two heat exchangers 122. Each of the heat exchangers contains a pair of coils 123 and 124 included in the conduits 113. Since the water within the heat exchanger is at or slightly above the desired final feed temperature, the liquid feed in flowing from the chamber 101 to the nipple 116 is brought to the appropriate temperature. If desired, additional temperature sensing thermostats 126 are provided at the heat exchangers for controlling the operation of the water heater and the pump 121.

When the carriage arrives at a station, all four of the chambers 101 are loaded with the preselected amount of liquid feed. The nipples 116 stop opposite the access opening 17 in the pens and the calves extend their heads through the openings and engage the nipples. They withdraw the liquid feed through the conduits 113 at the proper temperature. Release of the regulated amount of the feed continues until each chamber is emptied. The feeding can readily be accomplished by each calf before the timing mechanism 63 propels the carriage from one station to the next. Each calf gets its preselected amount of warmed liquid feed and at the time the carriage leaves each station the individual chambers are empty and are ready for successive operation. If there is any excess, it is included in the fixed quantity for the next user of the chamber.

In order to prevent the transmission of disease and to maintain a sanitary condition means are provided on the carriage for disinfecting the various nipples 116. Surrounding each of the nipples is a semi-circular hoop guard 131. The area immediately surrounding each nipple is partially enclosed. As the carriage moves, the calf must withdraw his head from the guard and leave the nipple free. Disposed immediately above each of the nipples is a spray nozzle 132 at the end of a conduit 133. A connecting conduit 134 extends also to similar arrangements at the other portions of the machine and is connected to a disinfectant pump 136. A line 137 extends from the pump to a disinfectant tank 138. Preferably the pump 136 is either a metering pump or is operated intermittently. The pump 136 is electrically driven and operates only as the carriage 31 advances from one station to the next. As soon as the carriage leaves one station and the nipples are disengaged by the calves, a spray of disinfectant from the nozzle 132 is ejected not only over the nipples themselves but also onto the guard 131 and the adjacent portion of the carriage structure. Excess disinfectant runs down the sides of the enclosure 95 and eventually finds its way into the drain trough 26.

Medication can be provided to any one or ones of the calves being fed by an appropriate signal button 57 properly positioned. This is not often utilized, so is illustrated in FIGURE 6 as applied to only one of the chambers 101. A vial 141 of medication is connected to an electrically controlled force and measuring pump 142. Leads 143 and 144 extend to a controlling electric circuit. A liquid conduit 146 extends from the pump 142 to the particular chamber 101. As the carriage arrives at a station, a special button 57 actuates the circuit for the electrical pump 142 and a measured amount of medication from the vial 141 is delivered into the liquid feed chamber 101 along with the normal liquid feed and is withdrawn from the chamber by the particular calf utilizing the connected nipple 116.

The general mode of operation is for the carriage to rest in the shed 6 in between feedings. At the appropriate hour or time, the carriage starts automatically and travels to the successive stations along the track. The carriage pauses at each station for a short time so that the four calves thereat can each withdraw the preselected amount of warmed, liquid food along with any necessary medication. As the feeding period at each station expires, the carriage re-starts automatically and advances to the next station, during which time disinfectant is sprayed over the various nipples. The chambers 101 are refilled with preselected quantities of liquid feed for the four calves at this next station. In the event it is intended that any station be skipped, an appropriate one of the buttons 57 is withdrawn and the carriage continues past that station without stopping.

When all of the calves along the entire track have been fed, the driving motor 39 is reversed and the carriage returns without stopping to its position within the shed. In the event of any obstruction, the engaged bumper automatically shuts down the carriage motion until an attendant, called by an alarm, takes corrective action. After the carriage has been returned to the shed 6 it can sit without attention until the next feeding period arrives. The timing control 54 then repeats the operation. It is customary to have the tank 82 large enough so that several trips of the carriage can be made without attention. Eventually the covers 83 and 84 are opened and the tank 82 is disinfected or cleaned and is replenished.

It is found in actual practice that the calves very quickly become accustomed to the mechanism and not only have no difficulty in obtaining their liquid feed but do so in adequate time before the carriage moves from one station to the next. It is possible for the operation to be carried on at odd hours and repeatedly without any human supervision at all. The calves are regularly and uniformly fed without the necessity of constant supervision. The amount of feed for any particular animal is readily regulated. Special supplements or medication can be provided for any particular animal at any time and can readily be discontinued simply by revising the position and arrangement of the buttons 57 in the cross ties.

What is claimed is:

1. A livestock feeder comprising: a track having a pair of ends and a plurality of stations thereon between said ends; a carriage movable along said track; means on said carriage for driving said carriage along said track; means for supplying said driving means with power; means at each of said stations and adjacent said track for inactivating said driving means for a predetermined interval at each of said stations; means on said carriage for holding a supply of liquid feed; a plurality of feeding nipples on said carriage; means for conducting liquid feed from said holding means to said nipples; means at each of said stations and adjacent said track for controlling the flow of said liquid feed to each one of said plurality of nipples, said flow controlling means including devices at each of said stations selectably positionable for varying the quantity of liquid feed flowing to each of said nipples; and, means at both ends of said track for reversing the direction of operation of said driving means.

2. A livestock feeder comprising: a track having a pair of ends and a plurality of stations thereon between said ends; a carriage movable along said track; means on said carriage for driving said carriage along said track; means for supplying said driving means with power; means at each of said stations and adjacent said track for inactivating said driving means for a predetermined interval at each of said stations; means on said carriage for holding a supply of liquid feed; a plurality of feeding nipples on said carriage; means for conducting liquid feed from said holding means to said nipples; means at each of said stations and adjacent said track for controlling the flow of said liquid feed to each one of said plurality of nipples; means at both ends of said track for reversing the direction of operation of said driving means; and, means on said carriage for disinfecting said nipples between each of said stations during movement of said carriage along said track in one direction.

3. A livestock feeder comprising: a track having a pair of ends and a plurality of stations thereon between said ends; a carriage movable along said track; means on said carriage for driving said carriage along said track; means for supplying said driving means with power; means at each of said stations and adjacent said track for inactivating said driving means for a predetermined interval at each of said stations; means on said carriage for holding a supply of liquid feed; a plurality of feeding nipples on said carriage; means for conducting liquid feed from said holding means to said nipples; means at each of said stations and adjacent said track for controlling the flow of said liquid feed to each one of said plurality of nipples; means at both ends of said track for reversing the direction of operation of said driving means; a plurality of cross straps adjacent the stations included in said track, said cross straps each having a plurality of apertures therein; buttons receivable in any of said apertures; and a plurality of switches on said carriage selectively operable by said buttons and, depending upon the position of said buttons in said apertures, for controlling the flow of said liquid feed.

4. A livestock feeder comprising:
 (a) a track supported on the ground and having a plurality of livestock feeding stations thereon;
 (b) a carriage movable along said track;
 (c) means for moving said carriage along said track;
 (d) means adjacent each of said livestock feeding stations for inactivating said carriage moving means at each of said stations;
 (e) means on said carriage for holding a supply of liquid feed;
 (f) a feeding nipple on said carriage;
 (g) means for conducting liquid feed from said holding means to said nipple; and,
 (h) means adjacent each of said livestock feeding stations for controlling the flow of said liquid feed to said nipple, said flow controlling means including devices adjacent each of said stations selectably positionable for varying the quantity of liquid feed flowing to said nipple.

5. The livestock feeder of claim 4 wherein said selectably positionable devices include buttons locatable at predetermined positions along said track; and wherein said carriage includes a plurality of switches selectively operable by said buttons for controlling the flow of said liquid feed in dependence upon said predetermined positions of said buttons.

6. The device of claim 4 further characterized by means on said carriage for disinfecting said nipple after each stop of said carriage along said track.

References Cited by the Examiner

UNITED STATES PATENTS

| | | | |
|---|---|---|---|
| 2,263,069 | 11/41 | Coyner | 119—71 |
| 2,786,448 | 3/57 | McMaster | 119—52 |
| 3,037,481 | 6/62 | Kloss | 119—71 |
| 3,097,627 | 7/63 | Garcia | 119—51.11 |
| 3,108,571 | 10/63 | Patz | 119—51 |

SAMUEL KOREN, *Primary Examiner.*

ALDRICH F. MEDBERY, *Examiner.*